United States Patent [19]

Grindstaff et al.

[11] 4,369,171

[45] Jan. 18, 1983

[54] PRODUCTION OF PITCH AND COKE FROM RAW PETROLEUM COKE

[75] Inventors: Lloyd S. Grindstaff; Edward E. Hardin, both of Elizabethton, Tenn.

[73] Assignee: Great Lakes Carbon Corporation, New York, N.Y.

[21] Appl. No.: 241,435

[22] Filed: Mar. 6, 1981

[51] Int. Cl.³ .......................... C01B 31/02; C10C 3/08
[52] U.S. Cl. .................................. 423/461; 208/22; 208/39; 208/45; 252/502; 264/29.1; 423/448; 423/449
[58] Field of Search ............... 423/461, 448, 449; 208/39, 22, 8 LE, 45; 106/284; 264/29.1, 29.5; 252/502; 201/17

[56] References Cited

U.S. PATENT DOCUMENTS

| | | | |
|---|---|---|---|
| 1,822,349 | 9/1931 | Jannek et al. | 208/8 LE |
| 2,603,592 | 7/1952 | Nelson | 208/23 |
| 3,318,801 | 5/1967 | Alexander et al. | 208/40 |
| 3,382,084 | 5/1968 | Folkins et al. | 106/284 |

FOREIGN PATENT DOCUMENTS 811042  4/1969  Canada .
49729  12/1954  India .

*Primary Examiner*—Edward J. Meros
*Attorney, Agent, or Firm*—Adrian J. Good

[57] ABSTRACT

Raw petroleum coke is treated with a solvent to extract the soluble matter. The extracted matter is useful as coker feedstock, fuel, pitch binder, pitch precursor, impregnant and carbon black feedstock. The coke residue may be used without further treatment as a fuel or may be calcined for use in Hall aluminum cell anodes.

5 Claims, 6 Drawing Figures

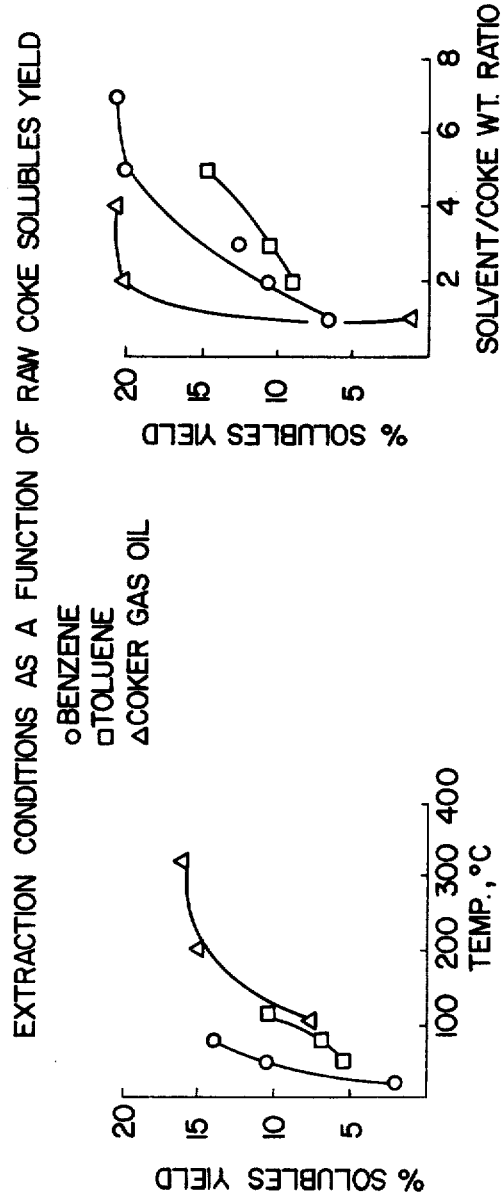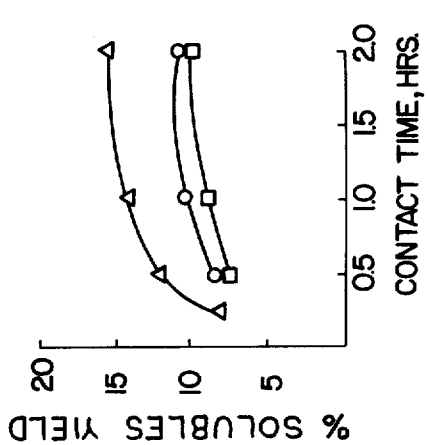

% BENZENE SOLUBLES VS. % VOLATILES

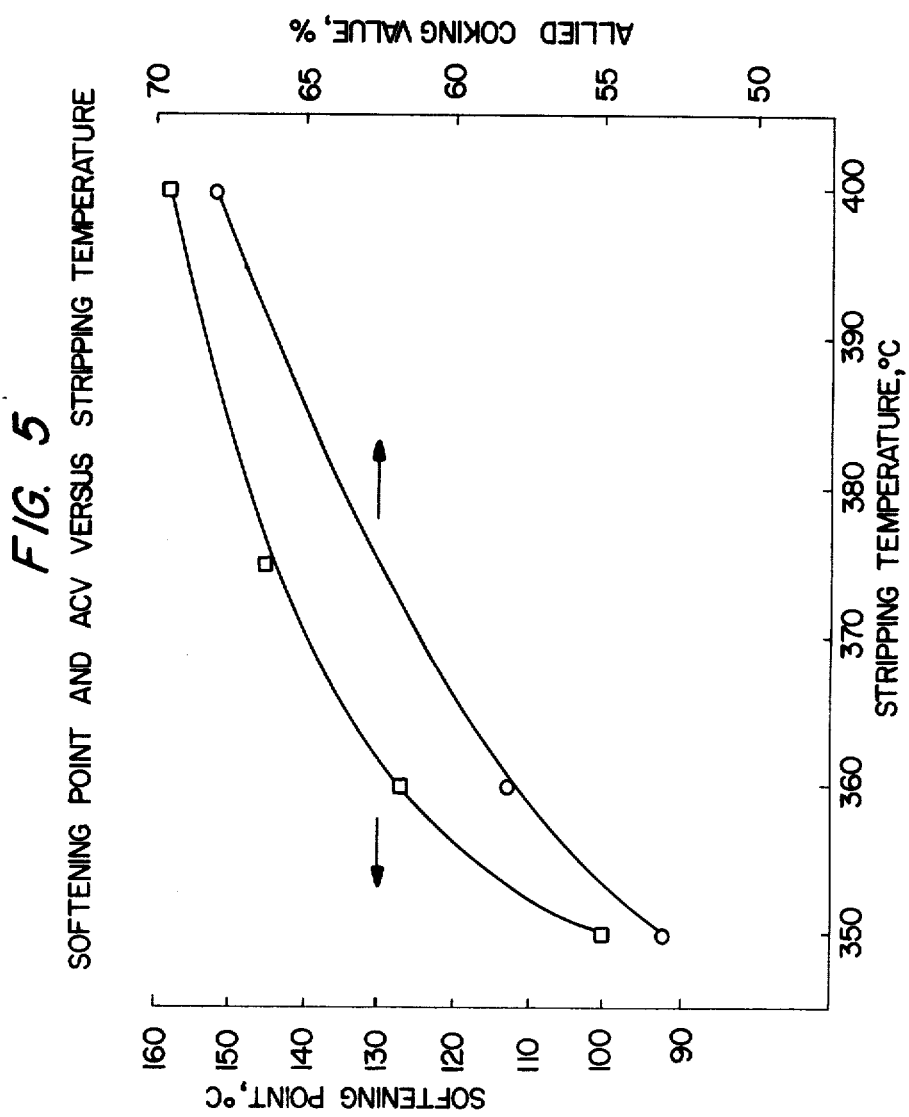

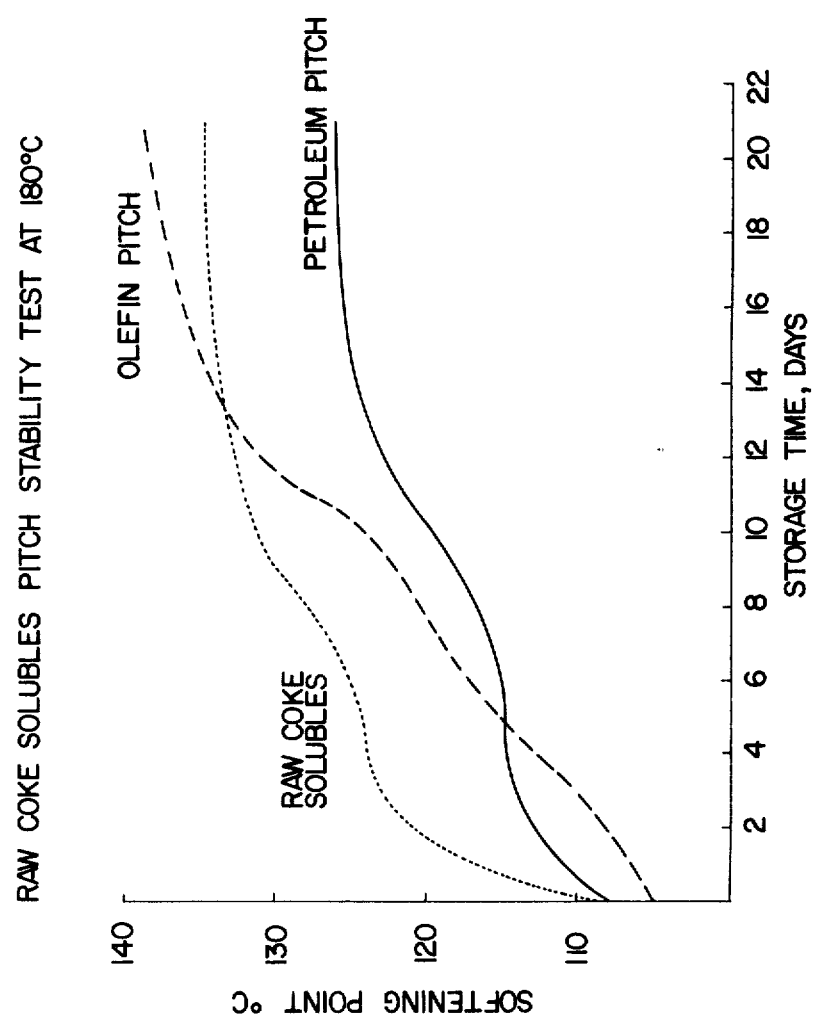

PRODUCTION OF PITCH AND COKE FROM RAW PETROLEUM COKE

BACKGROUND OF THE INVENTION

The production of coke from petroleum residues is the last in the line of processes operating on a specific fraction by the petroleum refining industry, in that after all the processes of distillation, cracking, reforming, hydrogenation and the other more thermodynamically gentle and chemically precise processes, there remains only a high temperature reaction which is essentially a destructive distillation. The final residue from destructive distillations, no matter what the starting material, is almost always eventually a coke, a solid carbonaceous residue, usually amorphous, containing a complex mixture of a large number of high molecular weight residual compounds. Normally from 75 to 95% of the residue is in the form of a carbonaceous structure which is essentially a polymeric hydrocarbon with irregular aromatic and aliphatic groups, linked by aliphatic chains of inhomogeneous types.

There are several types of raw petroleum coke, including fluid, shot, regular or sponge, and needle coke. Regular grades may be used for fuel or calcined to remove the low molecular weight volatile matter. The largest volume single use of calcined regular delayed coke is in the manufacture of anodes for Hall cell production of aluminum.

Other uses of raw petroleum coke are disclosed in U.S. Pat. No. 2,603,592 by H. W. Nelson, a solution of coke in solvent useful as a binder and asphalt substitute, and U.S. Pat. No. 3,382,084, by Folkins, extraction of coke with basic nitrogenous organic solvents with a mixture of the extract and petroleum pitch used as a binder.

A large number of processes have been used to produce binder pitches from various petroleum residues, of which U.S. Pat. No. 3,318,801 to Alexander, Cl. 208-40, and Canada Pat. No. 811,042 to Mobil Oil, Apr. 22, 1969, are examples. Alexander discloses a binder somewhat similar in composition to the binder produced by the present process.

SUMMARY OF THE INVENTION

Raw petroleum coke is extracted with a hot solvent, the mixture of solution and undissolved solids is separated by filtration, decantation, centrifugation, etc. and the solvent distilled off, leaving an extract which has utility as a binder and impregnant.

From one to seven parts of solvent by weight is used for one part of coke, with the preferable ratio, on the bases of material handling and solvent losses, in the range of one to two parts solvent to one part of coke.

The extraction is carried out by contacting the coke with solvent at or near the atmospheric boiling point of the solvent, extracting the maximum quantity of solubles in the shortest time, which is preferably from one to two hours.

A simple reaction vessel is used, with the appropriate equipment including the mixers, pumps, heaters, separation, filtration and distillation equipment necessary to carry out the process.

Solvents used are chosen from benzene, toluene, xylene, tetrahydrofuran, tetralin, coker distillates such as coker gas oil, and similar hydrocarbon solvent fractions. The higher boiling solvents are preferred, particularly a coker gas oil of 320° C. distillation end point. Mixtures of these solvents may be used also, and several of those used above are actually complex mixtures defined principally by their boiling points. The coker gas oil used is described as containing a significant fraction of aromatic compounds, giving it excellent solvent power.

Separation of the resulting solution of coke solubles from the remaining solids in the resulting slurry is accomplished by the processes of decantation, centrifuging, distillation, and the like. The solids may be further heated to improve recovery of the remaining entrapped solvent for re-use.

The extracted coke may be used as fuel or may be calcined at a temperature of 1150° to 1500° C. to make it suitable for use as the principal component of carbon electrodes in Hall process aluminum cells.

DETAILED DESCRIPTION OF THE INVENTION

Figure 4:
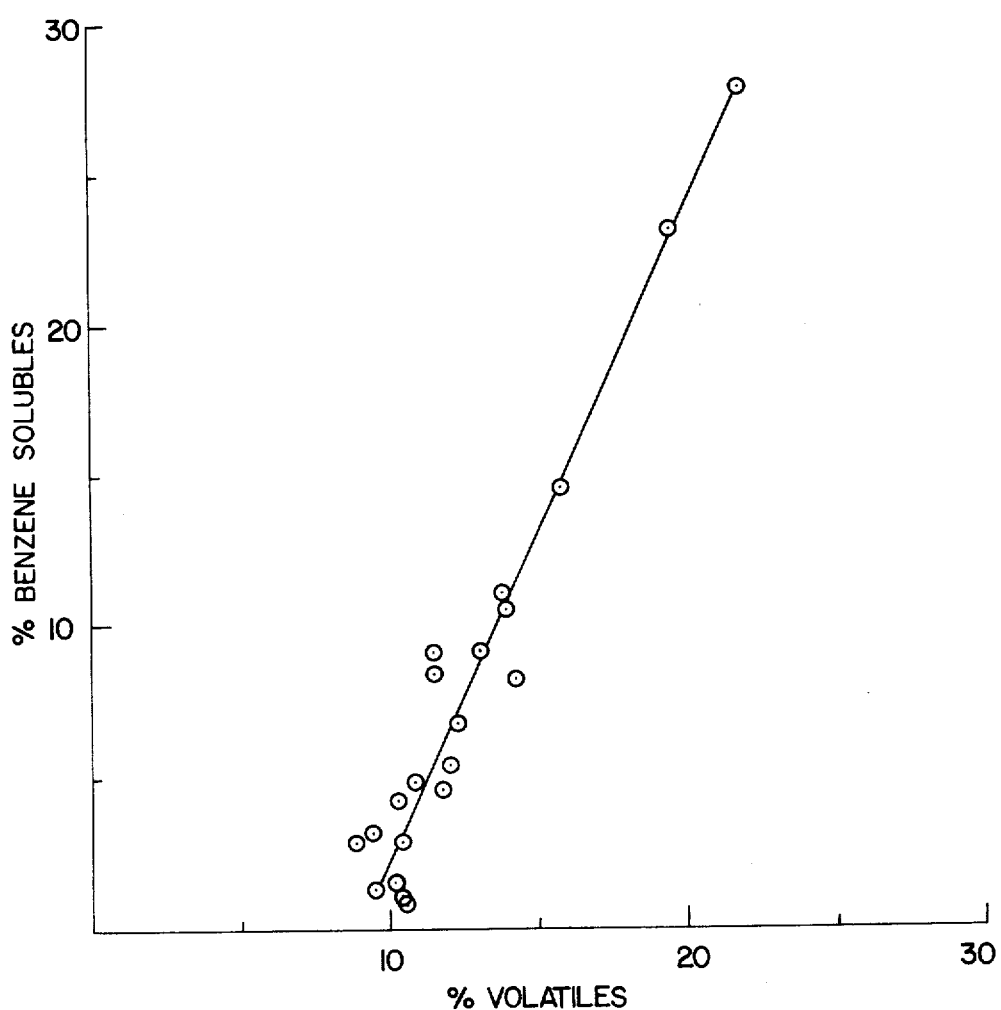

Raw petroleum coke is extracted with a selected solvent, the solids physically separated from the solution, and the extraction solvent is distilled off to leave a residue useful as a binder. The extracted coke may be calcined for use in aluminum reduction. It has a higher bulk density and lower electrical resistance than the original material when calcined at equivalent conditions.

The solid raw material for this process is a regular delayed petroleum coke, made from any of a wide variety of petroleum residues including reduced crudes, still bottoms, and other heavy residues. Regular cokes may contain from about 8% to 25% extractable matter.

The extract from the coke is composed principally of the lower molecular weight fractions, in relation to the main constituents of the coke. The gas oils and most of the low molecular weight fractions are distilled off during coking, which is nominally carried out at 482°–510° C. (900°–950° F.). The volatile matter (VM) is determined by heating a sample of the coke at 950° C. using the method of ASTM D-3175. At that temperature many of the medium to high molecular weight components will volatilize or degrade to lower molecular weight fragments.

There is a general correlation between the percentage of volatile matter in the coke and the amount of benzene soluble extract, although cokes with volatile matter contents below 10% have very little soluble extract, and cokes with volatiles of about 20% tend to have more extractables than volatiles by the standard test, as shown in Table 1 and FIG. 4. Other solvents show the same general trend as to amounts extracted in relation to VM, with anthracene oil having much more solvent power for the extractables than the other solvents tried, extracting useful quantities of binder from cokes with as little as 10% VM.

TABLE 1

Percent Benzene Solubles vs. Percent Volatiles for Various Cokes

| Spl. No. | % Benzene Solubles | % VM |
|---|---|---|
| GT-971 | 1.0 | 10.5 |
| NT-1140 | 1.2 | 10.5 |
| NT-108 | 1.3 | 9.7 |
| NT-411 | 1.6 | 10.2 |
| OT-43 | 2.9 | 8.8 |
| OT-44 | 3.0 | 10.5 |
| OT-42 | 3.2 | 9.5 |
| OT-317B | 4.2 | 11.4 |

TABLE 1-continued

Percent Benzene Solubles vs. Percent Volatiles for Various Cokes

| Spl. No. | % Benzene Solubles | % VM |
|---|---|---|
| OT-267 | 4.7 | 11.9 |
| MT-76 | 4.9 | 10.8 |
| MT-131 | 5.4 | 12.2 |
| NT-207 | 6.8 | 12.4 |
| MT-2328 | 8.3 | 14.3 |
| OT-40 | 8.5 | 11.6 |
| OT-41 | 9.1 | 11.7 |
| OT-317A | 9.2 | 13.1 |
| OT-344 | 10.6 | 14.0 |
| OT-343 | 11.2 | 13.9 |
| OT-321 | 14.7 | 15.8 |
| MT-1206 | 23.3 | 19.6 |
| OT-45 | 27.8 | 21.8 |

A number of solvents were evaluated and rated for amount and quality of pitch extracted as coke extractants.

(1) Benzene. A good solvent. Solubles softening point (Ring and Ball) 118° C.

(2) Tetrahydrofuran. A good solvent. Solubles softening point 135° C.

(3) Pyridine. Apparently a selective solvent for a relatively high molecular weight fraction with a softening point of 175° C. High extraction of beta resins.

(4) Tetralin. A satisfactory solvent. Solubles softening point 103° C.

(5) Thermal tar distillate, 250° C. end point. A relatively poor solvent.

(6) Toluene. Solubles softening point 95° C. Slightly poorer solvent than benzene.

(7) Coker gas oil overheads, 320° C. end point. A good solvent. Solubles softening point 125° C.

(8) Anthracene oil, 320° C. end point. An excellent solvent. Solubles softening point 115° C. Extracted two to three times more solubles than other solvents, but a high extraction of beta resins.

(9) Quinoline. Highly degradative of coke particle size and resulting dispersion difficult to filter. No reliable data on solubles obtained.

(10) Petroleum ether. (60°-70° C. B.P.) A poor solvent.

Data on eight of the solvents above as extractants with several raw petroleum cokes are listed in Table II below. The properties of the solubles show considerable differentiation with the solvent used.

It is believed that small amounts of insolubles, such as Q.I. and B.I., are formed during the removal of solvent from the extract by distillation.

The anthracene oil was a refined creosote obtained from by-product coking of bituminous coal. It was further processed to remove crystalline impurities.

In the samples of solubles above, it is apparent that pyridine extracted a particular high softening point (175° C.) fraction with a large benzene insoluble component (27.4%), quite dissimilar to the solubles extracted with other solvents in the group. Similarly, anthracene oil extracted a fraction high in benzene insolubles. The quinoline insoluble fraction consists principally of soot-like carbon particles, while the fraction which is quinoline soluble but benzene insoluble makes up the so-called beta resin fraction, which has long been regarded as the necessary and principal component of a satisfactory binder pitch.

We have found an unexpected result in that the extract from our process using specific solvents forms an excellent binder for carbonaceous matter when making carbon anodes for Hall aluminum cells and other carbon and graphite articles. Utility as a binder has long been perceived to rest in a high quantity of the beta resin fraction of a pitch. However, we have found that our extract, although low in beta resin content, forms an excellent binder. It is also low in quinoline insolubles.

We found that the maximum yield of solubles was obtained at or near the atmospheric boiling points of the solvents used, as shown in FIG. 1, using benzene at 80° C., toluene at 110° C., and coker gas oil at about 300° C.

We found that a maximum yield of solubles was obtained at a solvent to coke ratio from about 2 to 6 parts solvent to 1 part coke with the solvents evaluated, as shown in FIG. 2.

We found an extraction time of two hours to be the longest usually necessary, with one hour yielding 10% solubles, as shown in FIG. 3.

As shown in FIG. 4, the amount of benzene soluble matter extracted is directly related to the VM in the coke. To obtain 10% or more solubles, we found it necessary to have cokes with at least 15% VM, except when using anthracene oil, which would extract more than 10% solubles from cokes with less than 15% VM and was useful as an extractant for cokes with as little as 10% VM.

Several parameters affect coke solubles quality as

TABLE II

| | | Solubles | | | | | |
|---|---|---|---|---|---|---|---|
| Coke | Solvent | Softening point °C. (RING & BALL) | Sp. Gr. | %[1] ACV | %[2] Q.I. | %[3] B.I. | %[4] β Resin |
| MT1206 | Benzene | 118 | 1.21 | 64 | 0.8 | 1.5 | 0.7 |
| MT1206 | Tetrahydrofuran | 135 | 1.24 | 56 | 0.9 | 7.5 | 6.6 |
| MT1206 | Pyridine | 175 | 1.19 | 56 | 5.4 | 27.4 | 22.0 |
| MT1206 | 250° C. Thermal Tar Distillate | 127 | 1.15 | 58 | 0.6 | 2.8 | 2.2 |
| NT846 | Tetralin | 103 | 1.25 | 47 | 0.9 | 10.5 | 9.6 |
| MT1206 | Toluene | 95 | — | 61 | — | — | — |
| OT343 | 320° C. Gas Oil | 125 | — | 62 | 0.6 | 2.7 | 2.1 |
| OT321 | Anthracene Oil | 115 | — | 55 | 0.8 | 26.0 | 25.2 |

[1]ACV — Allied Coking Value - the % of coke remaining after a standard high temperature coking test.
[2]Q.I. — Quinoline insoluble.
[3]B.I. — Benzene insoluble.
[4]Beta resin — B.I. minus Q.I.

binder pitch. A higher stripping temperature increased both the allied coking value and the softening point, as shown in FIG. 5. Extraction temperature, contact time, solvent/coke ratio, and the type of coke used had little effect on the quality of the coke solubles.

An analysis of the solubles by nuclear magnetic resonance, ultimate analysis, and vapor pressure osmometry on the extracted solubles gave the following results, as compared to a pitch made from the tar produced when a hydrocarbon fraction is thermally cracked to olefins, commonly called ethylene tar.

TABLE III

|  | Coke Solubles | Ethylene Tar Pitch |
|---|---|---|
| C/H Ratio (atomic) | 1.22 | 1.33 |
| Molecular Wt. Av. | 508 | 489 |
| Aromaticity (calculated) | 0.788 | 0.816 |
| % of Hydrogen as |  |  |
| Methyl | 3.7 | 3.2 |
| Methylene | 15.3 | 9.8 |
| Benzylic | 32.8 | 36.5 |
| Aromatic | 48.1 | 50.9 |

Long term heat stability tests were run in steel cans at 180° C. in a vented oven and the increase in softening point (Ring and Ball) was compared with a commercially produced petroleum pitch and the above ethylene tar pitch, with results as follows in Table IV and FIG. 6:

TABLE IV

| Days at 180° C. | Softening Point °C. | | |
|---|---|---|---|
|  | Coke Solubles | Petroleum Pitch | Ethylene Tar Pitch |
| 0 | 108 | 108 | 105 |
| 3 | 123 | 114 | 110 |
| 6 | 125 | 115 | 117 |
| 9 | 130 | 118 | 122 |
| 13 | 133 | 124 | 133 |
| 21 | 135 | 126 | 139 |

These results show that these solubles are approximately equivalent to standard commercially produced pitches in long term thermal stability. After 13 days, change in all samples was slight.

Hall cell anodes were fabricated with a standard grade of calcined coke using three different binders, at a level of 15 parts binder per 100 parts coke of the extract above, coal tar pitch at 15 and 16 parts per 100 coke, and a petroleum pitch at 15 parts per 100 coke, as shown in Tables V and VI. Coke aggregate and binder were mixed at 160° C. and the mixes molded at 4°–7° C. above the softening point of each pitch. The molded pieces were baked on the schedule and evaluated as shown in Table VII below. The baking cycle will vary with the production method and piece size and is generally between 2 and 10 days.

The extracted binder may also be used with the extracted and calcined coke to produce Hall cell anodes thus using petroleum coke as the sole raw material, except for minor portions of additives.

TABLE V

Coke and Pitch Properties for Raw Coke Solubles Anode Binder Pitch Evaluation
Properties of Coke (MT-2160)

|  | Screen Analysis |  | Chemical Analysis (%) | |
|---|---|---|---|---|
| +1/2" | (+12.7 mm) | 3.0% | S | 1.00 |
| −1/2"/+3 | (−12.7 mm/+6.73 mm) | 16.5 | Si | 0.033 |
| −3/+4 | (−6.73 mm/+4.76 mm) | 8.4 | Fe | 0.0338 |
| −4/+8 | (−4.76 mm/+2.38 mm) | 20.3 | V | 0.0398 |
| −8/+14 | (−2.38 mm/+1.41 mm) | 23.6 | Ni | 0.040 |
| −14/+20 | (−1.41 mm/+0.84 mm) | 10.0 | Ca | 0.068 |
| −20 | (−0.84 mm) | 18.2 | Al | 0.0018 |
|  |  | 100.0% | Na | 0.055 |
| Bulk Density |  | 50.5#/ft$^3$ (809 kg/m$^3$) | | |
| Real Density by displacement in n-butanol |  | 2.01 g/cc | | |
| E.R. (Electrical Resistivity) |  | 0.039 Ω-in. (.099 Ω-cm) | | |
| Hardgrove Grindability Index |  | 30.4 | | |

TABLE VI

Properties of Anode Binder Pitches

| Pitch | S.P. | Density | QI | BI | ACV |
|---|---|---|---|---|---|
| Raw Coke Solubles | 116 (RB)[1] | 1.15 | 0.9 | 1.0 | 61.8 |
| Petroleum Pitch | 116 (CIA)[2] | 1.20 | 1.2 | 10* | 61.4 |
| Coal Tar Pitch | 105 (CIA) | 1.30* | 17.2 | 30.4 | 71.1 |

[1]Ring and Ball Method
[2]Cube in Air Method
*Nominal Value

TABLE VII

PROPERTIES OF ANODES WITH BINDERS AT 15–16 PARTS BINDER TO 100 PARTS PARTICULATE MIX

|  | Coke Extract | Petroleum Pitch | Coal Tar Pitch[5] | |
|---|---|---|---|---|
|  | 15pph | 15pph | 15pph | 16pph |
| Apparent Density g/cc |  |  |  |  |
| Unbaked | 1.623 | 1.614 | 1.590 | 1.616 |
| Baked[1] | 1.546 | 1.546 | 1.542 | 1.570 |
| Binder Yield % | 58.9 | 59.9 | 66.7 | 68.4 |
| E.R.[2] |  |  |  |  |
| Ω-in. × 10$^{-5}$ | 227 | 224 | 240 | 218 |
| (Ω-cm. × 10$^{-5}$) | 577 | 569 | 610 | 554 |
| MOR[3], PSI | 1090 | 1030 | 890 | 1180 |
| (kg./cm.$^2$) | 76.6 | 72.4 | 62.6 | 83.0 |
| CTE[4] cm/cm × 10$^{-7}$/°C. | 44 | 47 | 46 | 48 |

[1]The anodes above were baked at a schedule of 25° C./hr. rise from ambient to 300° C., 10°/hr. from 300°–700° C., and 33°/hr. from 700°–1100° C., for a total bake of 63 hours.
[2]Electrical Resistivity.
[3]Modulus of rupture.
[4]Coefficient of Thermal Expansion over the range 0°–50° C.
[5]Coal tar pitch at 16 pph was included as the mix was insufficiently wet with 15 pph.

The anodes above made with the soluble extract are equivalent to those made with petroleum pitch but inferior to those made with coal tar pitch on the basis of density, strength and resistivity.

Cokes extracted with 320° C. end point coker gas oil were evaluated for use as anode carbon in Hall aluminum cells. The cokes were extracted, the solids filtered and dried at 350° C. for one hour, then calcined within the range of 1150° to 1500° C. for ½ to 1 hour. Results are tabulated in Table VIII.

TABLE VIII

| Coke | OT-321 Control | OT-321 Extracted | OT-343 Control | OT-343 Extracted |
|---|---|---|---|---|
| BEFORE CALCINING | | | | |

TABLE VIII-continued

| Coke | OT-321 Control | OT-321 Extracted | OT-343 Control | OT-343 Extracted |
|---|---|---|---|---|
| Volatiles % | 14.8 | 11.7 av. | 14.0 | 12.5 |
| AFTER CALCINING | | | | |
| B.D.[1] g/100cc | 62.5 | 65.4 | 60.6 | 63.3 |
| E.R.[2], Ω-in. | 0.044 | 0.038 | — | — |
| (Ω-cm) | 0.11 | 0.096 | — | — |
| Porosity[3] | | | | |
| 100–15μ | 26 | 39 | | |
| 15–0.1μ | 51 | 71 | | |
| 0.1–.014μ | 15 | 17 | | |
| 100–0.014μ[4] | 92 | 127 | | |
| Hg A.D.[3] | | | | |
| 2.14 psi (.15 atm) | 1.69 | 1.58 | | |
| 14.7 psi (1 atm) | 1.77 | 1.69 | | |
| 15000 psi (1020 atm) | 2.00 | 1.99 | | |

[1]B.D. — Bulk density of the fraction passing a 4 mesh per inch (1.6 mesh per cm.) screen and retained on a 6 mesh per inch (2.4 mesh per cm.) screen. (−4/+6M)
[2]An empirical electrical resistivity test, valid for comparison purposes of coke particles only.
[3]Porosity (mm³/g.), and Apparent Density (A.D., g/cc) by mercury method at various pressures.
[4]Total porosity.

Aluminum cell anodes are made from coke particles with the approximate size distribution shown in Table V and flour 50% of which passes a 79 mesh per cm (200 mesh per in.) screen bound with pitch or other carbonizable binder, and formed by molding, extrusion, or vibratory shaping, then baked on a typical 2 to 3 day cycle. An increased bulk density of the raw materials is converted to a higher density finished product with better strength and more resistance to breakage and oxidation. A lower electrical resistivity is converted to a lower resistivity anode with better electrical efficiency. Both of these were unexpected advantages from the use of the extracted coke as shown in Table VIII. The porosity and apparent density data found verify that the coke produced is within an acceptable range for use in aluminum cell anodes.

The binder produced by the process of the invention is particularly useful, due to its lack of a second phase component, for the impregnation of porous solids to improve physical and electrical properties. In particular it may be used to impregnate pre-baked carbon electrodes which are then re-baked and graphitized to higher temperatures, for use in ultra high power electric arc furnaces.

The solution may also be used as a fuel, as carbon black oil, or recycled to the coker as a feedstock.

The extract may also be used as a binder for gravel in paving and roofing compositions, waterproofing, and coatings of various types.

The examples given above are illustrations only and the invention is not limited to the examples given.

We claim:

1. A process for the production of a pitch useful as a binder for carbon particulate matter and as an impregnant for porous carbon solids and of a coke useful for Hall cell anodes for the electrolytic production of aluminum, comprising extraction of raw petroleum coke with from 1 to 2 parts of a solvent to 1 part of coke by wt., said solvent selected from the group consisting of tetrahydrofuran, tetralin, coker gas oil having a distillation end point of approximately 320° and mixtures thereof, said extraction carried out at or near the atmospheric boiling points of said solvent, physical separation of the solid coke from the solution thus obtained, and distillation to recover said pitch from said solution, said pitch having less than 1% quinoline insoluble, not more than 10.5% benzene insoluble, and less than 9.6% beta-resin by wt.

2. The process of claim 1 wherein the extraction process is carried out for a period of approximately 1 to 2 hours.

3. The process of claim 1 wherein the raw petroleum coke used has a volatile matter content of at least 10% by weight.

4. A process for the production of a calcined coke useful for the formation of an anode for a Hall aluminum cell comprising extracting raw petroleum coke with from 1 to 2 parts of an organic solvent to 1 part of coke by wt., at a temperature near the atmospheric boiling point of said solvent selected from the group consisting of tetrahydrofuran, petroleum thermal tar distillate with 250° C. distillation end point, tetralin, gas oil coker with 320° C. distillation end point, or mixtures thereof, separating the resulting mixture to obtain solids and a solution of soluble matter in said solvent, heating the solids at an elevated temperature to recover entrapped solvent, and calcining the solids at an elevated temperature of 1150° to 1500° C. to recover said coke.

5. A process for the production of a petroleum pitch useful as a binder for particulate matter and as an impregnant for porous carbon solids comprising the extraction of raw petroleum coke with from 1 to 2 parts by wt. solvent to one part by wt. of coke, said solvent selected from the group consisting of tetrahydrofuran, tetralin, and coker gas oil having a distillation end point of approximately 320° C., or mixtures thereof, said extraction carried out by contacting said coke with said solvent at or near the atmospheric boiling point of said solvent for a period of from 1 to 2 hours, separation of the liquid solution thus obtained from the remaining coke solids by mechanical means, and separation of said pitch from said solvent by distillation to recover said pitch, having less than 1% quinoline insoluble, less than 10.5% benzene insoluble, and less than 9.6% beta-resin by wt.

* * * * *